May 30, 1967 KO-HSIN LIU 3,323,046
DIELECTRIC MEASURING SYSTEM INCLUDING PHASE
INVERTING MEANS AND A SUMMING AMPLIFIER
Filed Oct. 21, 1963 2 Sheets-Sheet 1
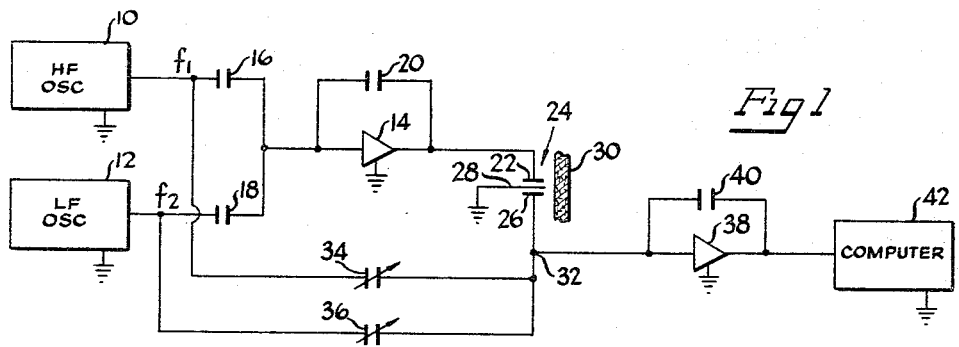
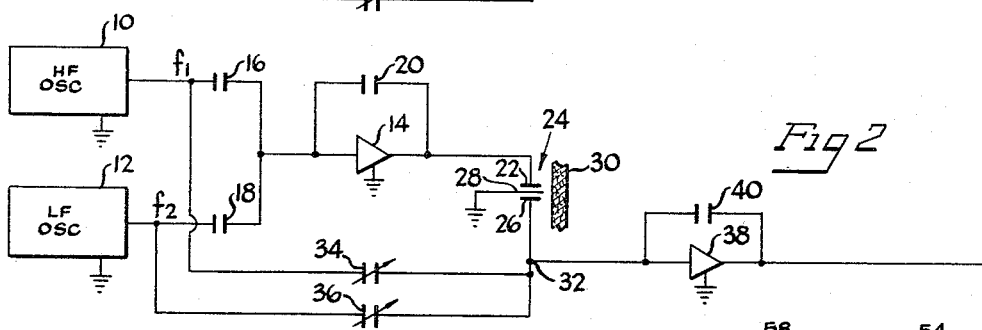
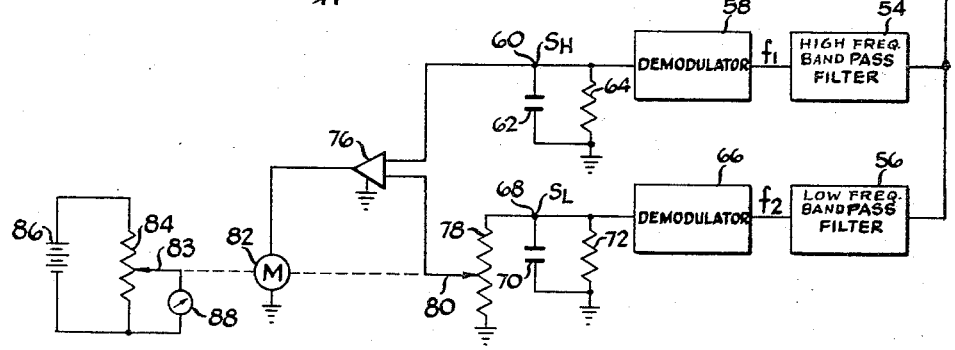
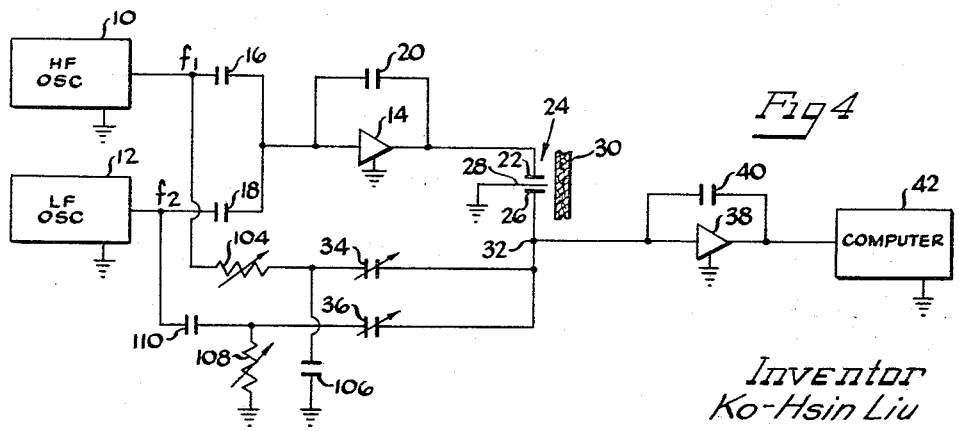
Inventor
Ko-Hsin Liu
By
Anderson, Luedeka, Fitch, Even & Tabin
Atty's

United States Patent Office 3,323,046
Patented May 30, 1967

3,323,046
DIELECTRIC MEASURING SYSTEM INCLUDING PHASE INVERTING MEANS AND A SUMMING AMPLIFIER
Ko-Hsin Liu, Hilliard, Ohio, assignor to Industrial Nucleonics Corporation, a corporation of Ohio
Filed Oct. 21, 1963, Ser. No. 317,426
8 Claims. (Cl. 324—61)

This invention relates generally to a measurement system having a plurality of signals at different frequencies applied to a capacitance probe and specifically to simplified bridge and bridge excitation circuits for use in such a system. This invention is particularly directed to a system for the measurement of moisture in a continuous product. The present invention is an improvement on the systems described in the copending applications Ser. No. 41,975, filed July 11, 1960, for Measuring System, by Albert F. G. Hanken, now Patent No. 3,155,900, and Ser. No. 268,268, filed Mar. 27, 1963, for Measuring System, by Alan Norwich, now Patent No. 3,290,588.

As is known in the prior art, this system includes a capacitance probe which forms part of a bridge circuit. The probe includes as a dielectric the material to be measured. This system is particularly adapted for the measurement of moisture in a continuously moving product such as a paper web. The bridge includes balancing capacitance means. The bridge is supplied with a pair of signals at separate frequencies. Bridge balance in the absence of material at the probe is achieved by adjustment of the balancing capacitance means. Then when material is placed in the probe, the bridge becomes unbalanced at both frequencies. An output signal is developed at each frequency resulting from these input signals as influenced by the material in the probe. The output signals at each frequency are isolated and then applied to a computer which provides an indication of a qualitative or quantitative property of the material in the probe. The present invention is directed to a simplified bridge and bridge excitation circuit.

In accordance with the present invention signal sources of two different frequencies are applied to energize a bridge circuit. Signals at each frequency are preferably separately applied to an A.C. summing amplifier. This amplifier preferably includes first and second input impedances to each of which a respective signal is applied. A feedback impedance is coupled between the output and input of the amplifier, the first and second input impedances and the feedback impedance being like. The output signals of the amplifier are thus equal to the sum of the signals from the respective sources without producing any appreciable influence of one signal upon the other. The summing amplifier does however invert the phase of the signals. The inverted compound signals are applied to one electrode of a capicitance probe, the other electrode being connected to an output circuit, preferably to another amplifier including feedback. The signals from the respective signal sources are at the same time applied without phase reversal through respective balancing capacitors directly to this same output circuit. The output amplifier then acts as a summing amplifier to add the signals through the capacitance probe to the signals through the balancing capacitors.

The balancing capacitors are adjusted in the absence of material at the probe to provide signals that balance the signals through the probe; that is, with no material in the probe there is no signal developed by the output circuit. Under such conditions, the output circuit develops signals only when the material is placed in the probe, and the output signals thus developed are directly related to the material in the probe in accordance with the teachings of the prior art, particularly those of the copending Hanken application Ser. No. 41,975. The output signals at each frequency may be isolated and compared in a computer or read-out circuit to provide an indication of some property of the material, most particularly its moisture content or mass.

Preferably the signals applied to the probe are substantially exactly 180° out of phase with the signals applied to the balancing capacitors, for to the extent that this is not attained, the signals will not be balanced out with no material at the probe. The summing amplifier used to amplify signals to the capacitance probe provides substantially 180° phase shift. However, various circuit elements inherently provide certain additional phase shifts. When such phase shift would cause appreciable error in the measurement, this phase shift can be compensated for by adding compensating phase shifts. This may be achieved by adding RC networks between the signal sources and the balancing capacitors; alternatively, networks can be included as separate circuits between the signal sources and the bridge output circuit.

The system thus comprises a bridge in which the capacitance probe is in one arm and the balancing capacitors are in the other. Actually, there are two bridges, one for each frequency, with one one of the balancing capacitors in each bridge. Signals at two frequencies are applied to respective balancing capacitors. These signals are inverted and applied to the capacitance probe. The bridge is balanced with no material at the probe. Material at the probe then unbalances the bridge at both frequencies. The unbalance signals at the two frequencies are then compared to provide a measure of the moisture content of the material.

Accordingly, one object of the present invention is to provide new and improved bridge and bridge excitation circuits for use in a multi-frequency measuring system, particularly one for measuring moisture in a continuous process.

It is a specific object of the present invention to provide a bridge excitation circuit in which signals of two frequencies are applied through a summing amplifier to the capacitance probe and signals from the same source are applied to respective balancing capacitors, the output of the bridge being developed through a feedback amplifier.

It is still another object of the present invention to provide means for compensating for phase shift in order to achieve substantially complete bridge balance in the absence of material in the capacitance probe.

Further objects and features of the present invention will become apparent from the following detailed description particularly when taken in conjunction with the accompanying drawings in which:

FIGURE 1 is a diagrammatic illustration of one form of the measuring system of the instant invention, showing preferred bridge and bridge excitation circuits;

FIGURE 2 is a diagrammatic illustration of the measuring system of the instant invention, showing one form of computer or read-out circuit useful with the bridge and bridge excitation circuits shown in FIGURE 1;

FIGURE 4 is a diagrammatic illustration of a modified form of the invention as shown in FIGURE 1, including phase shift compensating means.

Figure 3:
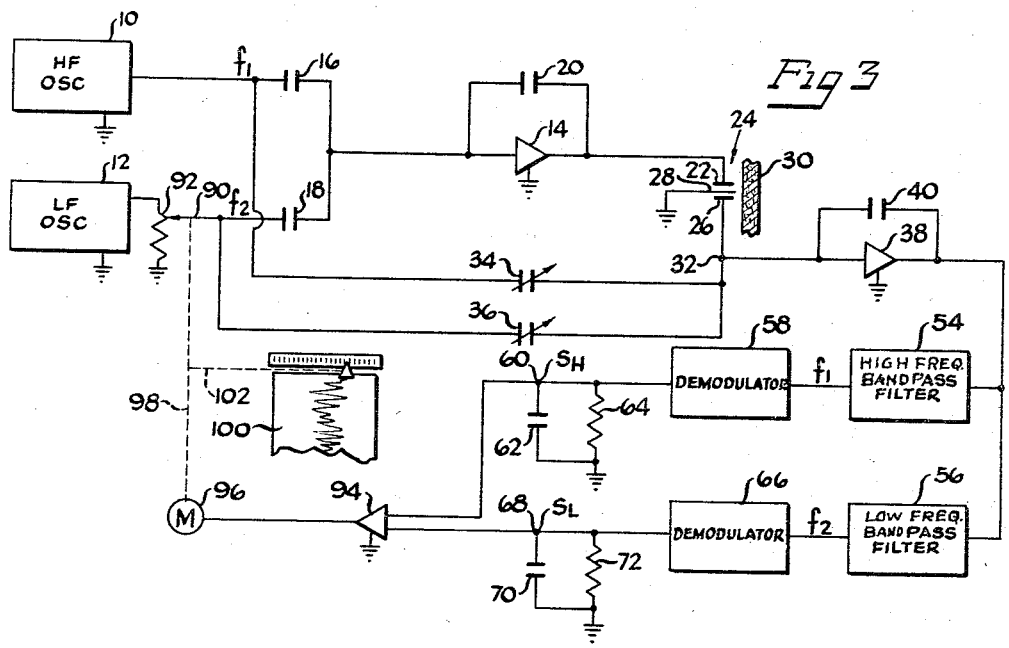
FIGURE 3 is a diagrammatic illustration of the measuring system showing a modified form of read-out circuit.

In FIGURE 1 there is illustrated a simplified form of a system utilizing the present invention. As shown in FIGURE 1 a pair of oscillators 10 and 12 are operative to produce a pair of signals. These two signals are at widely displaced frequencies and are referred to hereinafter as the high and low frequency signals, $f_1$ and $f_2$, respectively. In certain measurements, it has been found convenient and desirable to use frequencies of 100 kilocycles and 500 kilocycles. The signals are fed to an A.C. feedback amplifier 14 through respective input impedances 16 and 18. The amplifier has a feedback circuit through impedance 20. The amplifier 14 is thus connected as a form of A.C. summing amplifier. The impedances 16, 18 and 20 are preferably capacitors. These capacitors may all have the same capacitance although this is not necessary. It is also not necessary that they be pure capacitors; however, it is important that the impedances be like. With impedances 16, 18 and 20 like, the signals at the output of amplifier 14 are of opposite phase from the signals from the oscillators 10 and 12 and are equal to the sum of the oscillator signals each divided by the ratio of the respective input impedance 16 or 18 to the feedback impedance 20.

It is important that the impedances be like in order that the summing amplifier introduce substantially 180° phase shift at both frequencies. The current through the impedance 16 and 18 must flow through the feedback impedance 20 with no current flowing into the amplifier itself. In this case, if the impedances are like, the signals at the output of the amplifier are exactly 180° out of phase with the input signals. At each frequency the output signal is equal to the input signal divided by the ratio of the input impedance to the feedback impedance. This ratio should be real at all frequencies; that is, the feedback impedance should be substantially like the input impedances, although its magnitude may be greater or smaller; this is so that no appreciable phase shift is introduced in addition to the 180° phase shift of the amplifier 14. As used herein like does not necessarily imply the same magnitude.

The combined signals at the two frequencies are applied from amplifier 14 to an electrode 22 of a capacitance probe 24. The probe 24 preferably comprises a fringe field capacitor having a second electrode 26 and a grounded guard electrode 28 between electrodes 22 and 26. The material 30 being measured forms a part of the dielectric of the capacitance probe 24. Electrode 26 is connected to a bridge output terminal 32. At the same time, the signals from the high frequency oscillator 10 are applied through a balancing capacitor 34 to the output terminal 32. Likewise the signals from the lower frequency oscillator 12 are simultaneously applied through balancing capacitor 36 to the output terminal 32. This completes the bridge and bridge excitation circuits. At each of the two frequencies signals of one phase are applied between ground (as a reference datum) and electrode 22 of the capacitance proble 24 and signals of the opposite phase are applied between ground and the respective balancing capacitors 34 and 36, inasmuch as phase reversal is achieved by the A.C. summing amplifier 14.

The output of the bridge circuit is taken between output terminal 32 and ground and is applied to a detector amplifier 38 which has a feedback circuit comprising a capacitor 40. Amplifier 38 therefore also acts as an A.C. summing amplifier and derives at its output the sum of the signals applied through the capacitance probe 24 and the balancing capacitors 34 and 36. Inasmuch as the amplifier 14 effected phase reversal, the signals applied through the probe 24 are out of phase at each frequency with the signals applied at the respective frequency through the respective capacitors 34 and 36; this summing is therefore a subtraction. The capacitances of capacitors 34 and 36 are initially adjusted so that in absence of material in the probe, the sum of the signals is zero and no output signal is developed at the output of amplifier 38 at either frequency. When material is thereafter introduced into the probe, the unbalance at each frequency appears at the output of amplifier 38. This output may be applied to a computer 42 which may be of the sort disclosed in the aforesaid copending application of Hanken S.N. 41,975 or preferably that shown in the copending application of Frederick L. Maltby, Albert F. G. Hanken and Donald C. Brunton, S.N. 181,341, filed Mar. 21, 1962, for Measuring System. The computer functions to derive information as to the property of the material 30 being measured. As disclosed by Hanken, the output circuit 42 may operate to derive separate indications of the moisture content and mass per unit length of the material 30.

The computer 42 may take the form shown in more detail in FIGURE 2. If the bridge is balanced so that the output signals at the two frequencies are both at null in the absence of material in the probe, then when the material is placed in operative relationship to the probe, the bridge becomes unbalanced at both frequencies and the unbalance signals appear at the output of the output amplifier 38. The output signals from the amplifier 38 are applied simultaneously to a high frequency band pass filter 54 and a low frequency band pass filter 56. These filters serve to separate the signals at the two frequencies. The filter 54 passes the detection signal at the higher frequency, $f_1$, while filter 56 passes the detection signal at the lower frequency, $f_2$. The detection signal at the higher frequency is then applied to a demodulator 58, which may comprise a diode and serves to derive a D.C. detection signal at a terminal 60. A capacitor 62 and a resistor 64 may be connected between the terminal 60 and ground, as shown. The D.C. signal ($S_H$) thus derived on terminal 60 is thus a measure of the unbalance of the bridge at the higher frequency.

Similarly, the low frequency detection signal passing band pass filter 56 is applied to a low frequency demodulator 66 which derives a D.C. detection signal ($S_L$) on a terminal 68 which is connected to ground through a capacitor 70 and a resistor 72. The D.C. signal $S_H$ is applied to an input of a servo amplifier 76. The D.C. detection signal $S_L$ is applied to a ratio computing potentiometer 78 having a movable output tap 80 connected to the servo amplifier 76. The output of the servo amplifier 76 is applied to a servo motor 82 which operates in a conventional manner to drive the movable tap 80 of the ratio computing potentiometer 78 in such direction as to reduce the input to the servo amplifier 76, i.e., to make the input on tap 80 equal to the input at terminal 60. Thus in a conventional manner the balanced position of the ratio computing potentiometer is systematically related to the ratio of the signal on terminal 68 to the signal on terminal 60, i.e., $S_L/S_H$. This systematic relationship may be direct proportionality. At the same time, the servo motor 82 drives a tap 83 of a moisture readout potentiometer 84.

A fixed voltage source 86 may be applied between the terminals of the potentiometer 84 and an output signal read on a meter or recorder 88. The output signal indicates the position of tap 83 and hence the position of tap 80, which in turn is a measure of the ratio $S_L/S_H$, which is related to the property being measured, e.g., moisture. The potentiometer 84 and meter 88 may be calibrated empirically to read moisture.

By the circuit explained more fully in the aforesaid Hanken application, the computer 42 may equally derive the function $S_L - S_H/S_H$ which is equivalent to $(S_L/S_H) - 1$ and is likewise indicative of moisture content.

The present invention is also applicable to systems like that described in the copending application Ser. No. 259,116, filed Feb. 18, 1963, by Clyde W. Baird, now Patent No. 3,241,062, for Measuring System wherein the ratio $S_L/S_H$ is not directly determined but wherein an equivalent function is derived by modifying the output of the low frequency oscillator to maintain the ratio of detection signals constant, preferably at unity.

As shown in FIGURE 3, the output of the low frequency oscillator 12 is taken from a tap 90 on a potentiometer or voltage divider 92 in order that the magnitude of the signals therefrom can be varied by variation of the potentiometer setting. Except where the context indicates otherwise, the output signals of low frequency oscillator 12 will be considered herein as the signals appearing at tap 90.

The circuit operates like that described above in connection with FIGURE 2, except for the read-out circuit. In the circuit shown in FIGURE 3 the outputs of the demodulators are both applied to a servo amplifier 94, which acts in a conventional manner to produce an output of amplitude and polarity dependent upon the difference between the two D.C. signals, i.e., $S_L - S_H$. The output of amplifier 94 drives a servo motor 96 which mechanically through linking means 98 (which may be a shaft) moves the tap 90 to vary the output of the low frequency oscillator 12. Depending upon whether the signal $S_L$ is less than or greater than the signal $S_H$, the polarity of the output of servo amplifier 94 is such as to cause the motor 96 to rotate so as to move the tap 90 up or down, respectively, thus increasing or decreasing the output of low frequency oscillator 12 as necessary to reduce the difference between the two D.C. signals. So long as the two signals are different, the tap is moved. When the two signals are equal, the servo system is balanced, and the tap 90 is at that point on the slidewire that provides the appropriate amplitude of the output of the low frequency oscillator to produce this balance. The position of the tap is indicative of this output and is likewise indicative of moisture, as will now be shown.

As in the case of the system shown in FIGURE 2, the ratio of $S_L$ to $S_H$ is indicative of the moisture content of the material being measured. In the system of FIGURE 2, the outputs of the two oscillators were of equal amplitude. Were the output of the low frequency oscillator to be doubled, the ratio of $S_L$ to $S_H$ would be doubled. Hence, if the moisture content of the material were to change so as to cause the ratio of $S_L$ to $S_H$ to change from unity to two, the output of oscillator 12 could be reduced by a factor of two to return the ratio to unity. This is automatically done by the system of FIGURE 3, and the position of the tap 90 is related to the reciprocal of the ratio of $S_L$ to $S_H$ that would have existed had the oscillators had the same output, as in the system of FIGURE 2. A read-out device 100 may be coupled to the tap 90 by linkage means 102 so as to read out the tap position and hence moisture content. The particular relationship between tap position and the read-out scale is determined by the particular manner in which the potentiometer 92 is wound. The system can thus be calibrated empirically to read-out moisture content directly.

There will usually be inherent phase shifts in any circuit built in accordance with FIGURES 1, 2 or 3 which will prevent the adjustment of a perfect null balance. When the imperfection is so great as to have an appreciable effect upon the results, this undesirable phase shift can be compensated for by phase correction networks such as those shown in FIGURE 4. As shown in FIGURE 4 the phase shift correction at the high frequency may comprise an RC network such as series resistor 104 and shunt capacitor 106. Similarly, the lower frequency phase shift can be compensated for by an RC circuit such as that comprising series capacitance 110 and shunt resistance 108. In both cases, the phase adjustment can be made empirically while observing the output signals from amplifier 38 at the respective frequencies with no material in the probe.

Figure 5:
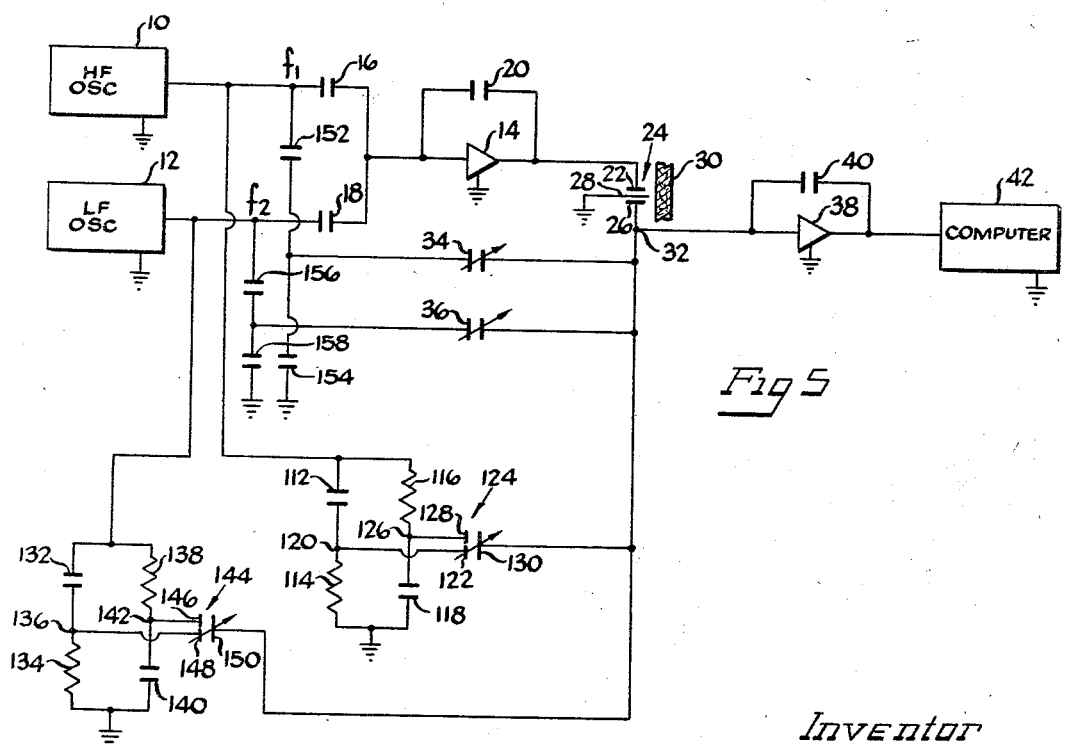
FIGURE 5 is a diagrammatic illustration of the bridge and bridge excitation circuits, showing a modified form of phase shift compensating means.

Alternative phase adjustment circuits are illustrated in FIGURE 5. As shown in FIGURE 5 the high frequency phase adjustment comprises a pair of RC networks connected between the high frequency oscillator and ground. One circuit comprises capacitor 112 and resistor 114 in series. The other comprises resistor 116 and capacitor 118 in series. The junction 120 between capacitance 112 and resistor 114 is connected to one plate 122 of a three-plate capacitor 124. The junction 126 between resistor 116 and capacitor 118 is connected to a second plate 128 of capacitance 124. The third plate of capacitor 124 is plate 130. The capacitor 124 is variable in such manner that when the capacitance between plates 128 and 130 increases the capacitance between plates 130 and 122 decreases. In this manner the plate 130 is selectively coupled more to one or the other of junctions 120 and 126. One of the phase adjusting circuits provides a lagging component while the other provides a leading component. In the circuit actually built, the phase shifting circuits provided about 85° phase shift, leading or lagging. By adjusting the capacitor 124, an amount of lagging phase shift can be selected from one circuit while an amount of leading phase shift can be selected from the other. The capacitor 124 is continuously adjustable so that the appropriate adjustment can be made to select such components that the combined phase shift is that required to place the bridge exactly in balance without material in the probe. Phase shift at the low frequency is similarly compensated for by a similar network comprised of a capacitor 132 and a resistor 134 having an intermediate junction 136. It is also comprised of a resistor 138 and a capacitor 140 having an intermediate junction 142. It further includes a three plate capacitor 144 having plates 146, 148 and 150.

Although signals from the oscillators 10 and 12 are applied both to the phase inverting amplifier 14 and the balancing capacitors 34 and 36, signals of the same amplitude are not required as balance depends also upon the relative magnitudes of the various impedances 16, 18 and 20 and the magnitudes of the capacitors 34 and 36. As shown in FIGURE 5, the signals from the oscillators may be coupled through voltage dividers. As shown, the voltage dividers may comprise capacitors 152 and 154 for reducing the magnitude of the signals applied to balancing capacitor 34, and corresponding capacitors 156 and 158 for reducing the magnitude of the signals applied to balancing capacitor 36. For example, if capacitors 152 and 154 are equal, the signal applied to capacitor 34 is half the full signal. If the capacitance is then doubled, the effect at the terminal 32 remains the same as for the full signal and half the capacitance.

Although certain specific embodiments have been described herein, modifications may be made thereto without departing from the true spirit and scope of the invention as set forth in the appended claims. For example, it should be noted that although the probe is called a capacitance probe, the dielectric constant of the material being measured may have an imaginary, i.e., resistive, component, and the probe electrodes need not be insulated from the material being measured. The invention also has applicability to a system where the frequency rather than the amplitude of the low frequency oscillator is varied to maintain the ratio $S_L/S_H$ constant, and that frequency is measured as an indication of moisture content. Such a system, but without the bridge or bridge excitation circuit of the present invention, is described in copending application Ser. No. 107,794, filed May 4, 1961, for Measuring System, by Albert F. G. Hanken, now Patent No. 3,155,901.

The present invention is also applicable to systems utilizing other computers or read-out circuits. For example, under certain conditions the ratio $S_L/S_H$ is a double valued function of moisture. This occurs at the higher moisture contents. To avoid this double-valued function, it has been known to modify the indication, as by limiting the value of the signal $S_H$. The present invention may be used with such read-out circuits.

The amplifiers 14 and 38 and the demodulators 58 and 66 may take the form shown for the corresponding components shown in greater detail in the copending application Ser. No. 317,533, filed Oct. 21, 1963, for Moisture Measuring System, by Ko-Hsin Liu.

What is claimed is:

1. A system for determining a property of a dielectric material comprising: a measuring probe having first and and second spaced electrodes for coupling said probe to said material, balancing impedance means coupled to said second electrode, signal generating means for generating first signals at a first frequency and second signals at a second substantially different frequency, means connected to said signal generating means for coupling said first and second signals to said balancing impedance means whereby said first and second signals are coupled to said second electrode through said balancing impedance means, phase inverting means connected to receive the signals coupled to said balancing impedance means for developing third and fourth signals at said respective first and second frequencies and substantially 180° out of phase with said respective first and second signals, means connected to said phase inverting means for coupling said third and fourth signals to said first electrode so as to apply said third and fourth signals to said second electrode through said measuring probe, the impedance of said balancing impedance means making said first and second signals passing therethrough substantially balance said third and fourth signals passing through said measuring probe in absence of material at the probe so that there are substantially no net signals developed at said second electrode at either of said first and second frequencies in the absence of material at said probe, and output means connected to said second electrode for measuring a function of the signals developed thereat at both of said frequencies with said material at said probe as an indication of said property of said dielectric material.

2. A system for determining a property of a dielectric material comprising: a measuring probe having first and second spaced electrodes for coupling said probe to said material, first and second balancing impedances coupled to said second electrode, signal generating means for generating first signals at a first frequency and second signals at a second substantially different frequency, means connected to said signal generating means for coupling said first and second signals to said first and second balancing impedances, respectively, whereby said first and second signals are coupled to said second electrode through said first and second balancing impedances, phase inverting means coupled to said signal generating means for developing third and fourth signals at said respective first and second frequencies and substantially 180° out of phase with said respective first and second signals, means connected to said phase inverting means for coupling said third and fourth signals to said first electrode so as to apply said third and fourth signals to said second electrode through said measuring probe, the impedance of said first and second balancing impedances making said first and second signals passing therethrough substantially balance said third and fourth signals passing through said measuring probe in absence of material at the probe so that there are substantially no net signals developed at said second electrode at either of said first and second frequencies in the absence of said material at said probe, and output means connected to said second electrode for measuring a function of the signals developed thereat at both of said frequencies with said material at said probe as an indication of said property of said dielectric material.

3. A system for determining a property of a dielectric material comprising: a measuring probe having first and second spaced electrodes for coupling said probe to said material; first signal generating means for generating at its output first signals at a first frequency, second signal generating means for generating at its output second signals at a second substantially different frequency; first and second capacitors; phase inverting means coupled to said first and second signal generating means for developing at its output third and fourth signals at said respective first and second frequencies and substantially 180° out of phase with said respective first and second signals; an A.C. summing amplifier with its input coupled to said output of said first signal generating means through said first capacitor, simultaneously coupled to said output of said second signal generating means through said second capacitor, and also simultaneously coupled to said output of said phase inverting means through said measuring probe, and serving to produce output signals indicative of the sum of its input signals, the capacitance of said first and second capacitors making the signals passing respectively therethrough substantially balance the signals passing through said measuring probe in absence of material at the probe so that there are substantially no net output signals developed by said A.C. summing amplifier at either of said first and second frequencies in the absence of said material at said probe; and output means connected to the output of said summing amplifier for measuring a function of the output signals developed thereby at both of said frequencies with said material at said probe as an indication of said property of said dielectric material.

4. A system for determining a property of a dielectric material comprising: a measuring probe having first and second spaced electrodes for coupling said probe to said material; first and second balancing impedances coupled to said second electrode; first signal generating means for generating first signals at a first frequency; second signal generating means for generating second signals at a second substantially different frequency; means coupled to said first signal generating means for coupling said first signals to said first balancing impedance whereby said first signals are coupled to said second electrode through said first balancing impedance; means coupled to said second signal generating means for coupling said second signals to said second balancing impedance whereby said second signals are coupled to said second electrode through said second balancing impedance; a phase inverting amplifier having a first input terminal and a first output terminal, a first input impedance coupled between said first input terminal and said first signal generating means, a second input impedance coupled between said first input terminal and said second signal generating means, a first feedback impedance coupled between said first input terminal and said first output terminal, said first and second input impedances and said feedback impedance being like, and means for coupling said first output terminal to said first electrode; the impedance of said balancing impedances making the signals passing therethrough substantially balance the signals passing through said measuring probe in absence of material at the probe so that there are substantially no net signals developed at said second electrode at either of said first and second frequencies in the absence of said material at said probe; an output amplifier having a second input terminal and a second output terminal, means coupling said second input terminal to said second electrode, and a second feedback impedance coupled between said second output terminal and said second input terminal; and output means connected to said second output terminal for measuring a function of the signals developed thereat at both of said frequencies with said material at said probe as an indication of said property of said dielectric material.

5. A system for determining a property of a dielectric material comprising: a measuring probe having first and second spaced electrodes for coupling said probe to said material, signal generating means for generating first signals at a first frequency and second signals at a second substantially different frequency, a phase inverting amplifier coupled to said signal generating means for developing third and fourth signals at said respective first and second frequencies and substantially 180° out of phase with said respective first and second signals, means connected to said phase inverting amplifier for applying said third and fourth signals to said first electrode, balancing impedance means coupled to said second electrode, means coupled to said signal generating means for coupling said first and second signals to said balancing impedance means, the impedance of said balancing impedance means being such as to make said signals passing therethrough to said second electrode substantially balance the signals passing through said measuring probe in absence of material at said probe so that there are substantially no net signals developed at said second electrode at either of said first and second frequencies in the absence of said material at said probe, and output means connected to said second electrode for measuring a function of the signals developed thereat at both of said frequencies with said material at said probe as an indication of said property of said dielectric material.

6. A system for determining a property of a dielectric material comprising: a capacitance probe having first and second spaced electrodes for coupling said probe to said material; first signal generating means for generating first signals at a first frequency; second signal generating means for generating second signals at a second substantially different frequency; a phase inverting amplifier coupled to said signal generating means for developing third and fourth signals at said respective first and second frequencies and substantially 180° out of phase with said respective first and second signals; means connected to said phase inverting amplifier for applying said third and fourth signals to said first electrode; a first balancing capacitor coupled between said first signal generating means and said second electrode; a second balancing capacitor coupled between said second signal generating means and said second electrode, the capacitance of said first and second balancing capacitors being such as to make the signals passing therethrough to said second electrode substantially balance the signals passing through said capacitance probe to said second electrode in absence of material at each probe so that there are substantially no net signals developed at said second electrode at either of said first and second frequencies in the absence of said material at said probe; an output amplifier having an input terminal and an output terminal, means coupling said input terminal to said second electrode, and a feedback impedance coupled between said output terminal and said input terminal; and an output means connected to said output terminal for measuring a function of the signals developed thereat at both of said frequencies with said material at said probe as an indication of said property of said dielectric material.

7. A system for determining a property of a dielectric material comprising: a measuring probe having first and second spaced electrodes for coupling said probe to said material; first signal generating means for generating first signals at a first frequency; second signal generating means for generating second signals at a second substantially different frequency; a phase inverting amplifier coupled to said first and second signal generating means for developing third and fourth signals at said respective first and second frequencies and substantially out of phase with said respective first and second signals; means connected to said phase inverting amplifier for applying said third and fourth signals to said first electrode; first balancing impedance means coupled between said second electrode and said first signal generating means; second balancing impedance means coupled between said second electrode and said second signal generating means; at least one of said first and second balancing impedance means including a phase shifting network, and said first and second balancing impedance means having impedances such as to make said signals passing therethrough to said second electrode substantially balance the signals passing through said measuring probe in absence of material at said probe so that there are substantially no net signals developed at said second electrode at either of said first and second frequencies in the absence of said material at said probe; and output means connected to said second electrode for measuring a function of the signals developed thereat at both of said frequencies with said material at said probe as an indication of said property of said dielectric material.

8. A system for determining a property of a dielectric material comprising: a capacitance probe having first and second spaced electrodes for coupling said probe to said material; first signal generating means for generating first signals at a first frequency; second signal generating means for generating second signals at a second substantially different frequency; a phase inverting amplifier coupled to said first and second signal generating means for developing third and fourth signals at said respective first and second frequencies and substantially 180° out of phase with said respective first and second signals; means connected to said phase inverting amplifier for applying said third and fourth signals to said first electrode; balancing impedance means including a first capacitor coupled between said first signal generating means and said second electrode, a second capacitor coupled between said second signal generating means and said second electrode, and phase shift means coupled between said second electrode and at least one of said first and second signal generating means for shifting the phase of at least one of said first and second signals as applied to said second electrode, the capacitance of said first and second capacitors and the phase shift introduced by said phase shift means being such as to make said first and second signals as applied to said second electrode substantially balance the signals passing to said second electrode through said capacitance probe in absence of material at said probe so that there are substantially no net signals developed at said second electrode at either of said first and second frequencies in the absence of said material at said probe; and output means connected to said second electrode for measuring a function of the signals developed thereat at both of said frequencies with said material at said probe as an indication of said property of said dielectric material.

References Cited

UNITED STATES PATENTS

| 3,241,062 | 3/1966 | Baird | 324—61 |
| 3,290,588 | 12/1966 | Norwich | 324—61 |

WALTER L. CARSON, *Primary Examiner.*

EDWARD E. KUBASIEWICZ, *Examiner.*